US007753756B2

(12) United States Patent
McDermott et al.

(10) Patent No.: US 7,753,756 B2
(45) Date of Patent: Jul. 13, 2010

(54) RADIO CONTROLLED SYSTEM AND METHOD OF REMOTE LOCATION MOTION EMULATION AND MIMICRY

(75) Inventors: Bryan R. McDermott, Manassas, VA (US); Walter L. Toney, Manassas, VA (US); Aron Z. Kain, Monsey, NY (US)

(73) Assignee: MT Remote Systems, LLC, Manassas, VA (US)

( * ) Notice: Subject to any disclaimer, the term of this patent is extended or adjusted under 35 U.S.C. 154(b) by 1314 days.

(21) Appl. No.: 11/245,079

(22) Filed: Oct. 7, 2005

(65) Prior Publication Data

US 2006/0077913 A1    Apr. 13, 2006

Related U.S. Application Data

(60) Provisional application No. 60/616,436, filed on Oct. 7, 2004.

(51) Int. Cl.
 *A63H 30/00* (2006.01)
(52) U.S. Cl. .................................. 446/454
(58) Field of Classification Search ............. None
 See application file for complete search history.

(56) References Cited

U.S. PATENT DOCUMENTS

| 5,696,706 | A | 12/1997 | Morton et al. | |
|---|---|---|---|---|
| 6,020,851 | A | 2/2000 | Busack | |
| 6,080,063 | A * | 6/2000 | Khosla | 463/42 |
| 6,254,478 | B1 | 7/2001 | Namanny et al. | |
| 6,463,385 | B1 | 10/2002 | Fry | |
| 6,483,511 | B1 | 11/2002 | Snyder | |
| 6,504,483 | B1 | 1/2003 | Richards et al. | |
| 6,604,996 | B1 | 8/2003 | Namanny et al. | |
| 6,612,925 | B1 * | 9/2003 | Forsberg | 463/6 |
| 6,726,567 | B1 | 4/2004 | Khosla | |
| 6,735,435 | B2 | 5/2004 | Newell et al. | |

(Continued)

FOREIGN PATENT DOCUMENTS

DE    100 31 026 A1    1/2002

(Continued)

OTHER PUBLICATIONS

"Real-Time GPS FX", Ken Milnes and Tom Ford, GSP World, Sep. 2001, pp. 12-18.

*Primary Examiner*—Ronald Laneau
*Assistant Examiner*—Tramar Harper
(74) *Attorney, Agent, or Firm*—Richard C. Litman

(57) ABSTRACT

An external positioning data linked radio controlled system and method for radio controlled vehicle (RCV) racing emulation including an infield RCV control device for receiving externally generated positional data from remote race vehicles on a remote race course, receiving locally input control signals from a user, an electronically reproduced racecourse map of the remote racecourse in a memory used to compute an electronic boundary for RCV devices, and error correction signals generated from feedback from an RCV. The infield RCV control device transmits wireless local control RCV signals containing RCV position, speed and direction data to each of a plurality RCVs responsive to the wireless local control RCV signals. The wireless local control RCV signals containing RCV position, speed and direction data based on processing the externally generated positional data, the locally input control signals, the electronically reproduced racecourse map, and error correction signals.

18 Claims, 3 Drawing Sheets

U.S. PATENT DOCUMENTS

| | | |
|---|---|---|
| 6,744,403 B2 | 6/2004 | Milnes et al. |
| 2002/0057217 A1 | 5/2002 | Milnes et al. |
| 2004/0035620 A1 | 2/2004 | McKeefery |
| 2004/0084546 A1 | 5/2004 | D'Angelo, Jr. et al. |

FOREIGN PATENT DOCUMENTS

| | | |
|---|---|---|
| EP | 0 806 230 A1 | 11/1997 |
| JP | 8-62321 | 3/1996 |
| JP | 2002-369976 | 12/2002 |

* cited by examiner

RADIO CONTROLLED SYSTEM AND METHOD OF REMOTE LOCATION MOTION EMULATION AND MIMICRY

CROSS-REFERENCE TO RELATED APPLICATION

This application claims the benefit of U.S. Provisional Patent Application Ser. No. 60/616,436, filed Oct. 7, 2004.

BACKGROUND OF THE INVENTION

1. Field of the Invention

The present invention generally relates to radio controlled devices and, more particularly, to motion emulation and mimicry at a remote location.

2. Description of the Related Art

Remote controlled vehicles and toys are well known in the arts, with many patents issued for various configurations, topologies, and characteristics. All use some form of a hand held, human operated controller that wirelessly sends control signals to the remotely controlled vehicle or toy. As the human manipulates the control signal via a joystick, trackball, or some form of potentiometer switch, the remote controlled (RC) toy or vehicle responds accordingly. However, this closed loop control system is restrictive in that external positioning signal cannot be implemented. Furthermore, positioning signals that mimic current live events are also not capable of being included in the current human, controller, remote controlled vehicle or toy system.

The popularity of racing events like NASCAR™ and Formula 1 has been increasing over the years. Racing event popularity has also fueled a variety of other commercial markets, including television viewing markets and the gaming industry. Radio controlled toys and vehicles have also been substantive over the years. A need exists to combine the sustained popularity of radio controlled vehicles with the popularity of racing events in the form of a GPS data linked radio controlled system and/or method.

SUMMARY OF THE INVENTION

An external positioning data linked radio controlled system and method for radio controlled vehicle (RCV) racing emulation including an infield RCV control device for receiving externally generated positional data from remote race vehicles on a remote race course, receiving locally input control signals from a user, an electronically reproduced racecourse map of the remote racecourse in a memory used to compute an electronic boundary for RCV devices, and error correction signals generated from feedback from an RCV. The infield RCV control device transmits wireless local control RCV signals containing RCV position, speed and direction data to each of a plurality RCVs responsive to the wireless local control RCV signals. The wireless local control RCV signals containing RCV position, speed and direction data based on processing the externally generated positional data, the locally input control signals, the electronically reproduced racecourse map, and error correction signals.

A method of controlling a radio controlled vehicle (RCV) racing emulation by an external positioning data linked radio controlled system comprising the steps of generating positional data from a plurality of remote vehicles, transmitting the positional data of the plurality of remote vehicles for reception at an infield RCV control device, receiving user input at the infield RCV control device, processing the transmitted positional data, the received user input, and an electronically reproduced racecourse map stored in memory to generate scaled positioning data, transmitting the scaled positioning data from a wireless transmission device on the infield RCV control device to be received by at least one RCV, processing the scaled positioning data at the at least one RCV, and controlling one of a motor or a servomotor on the at least one RCV as a result of the step of processing.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
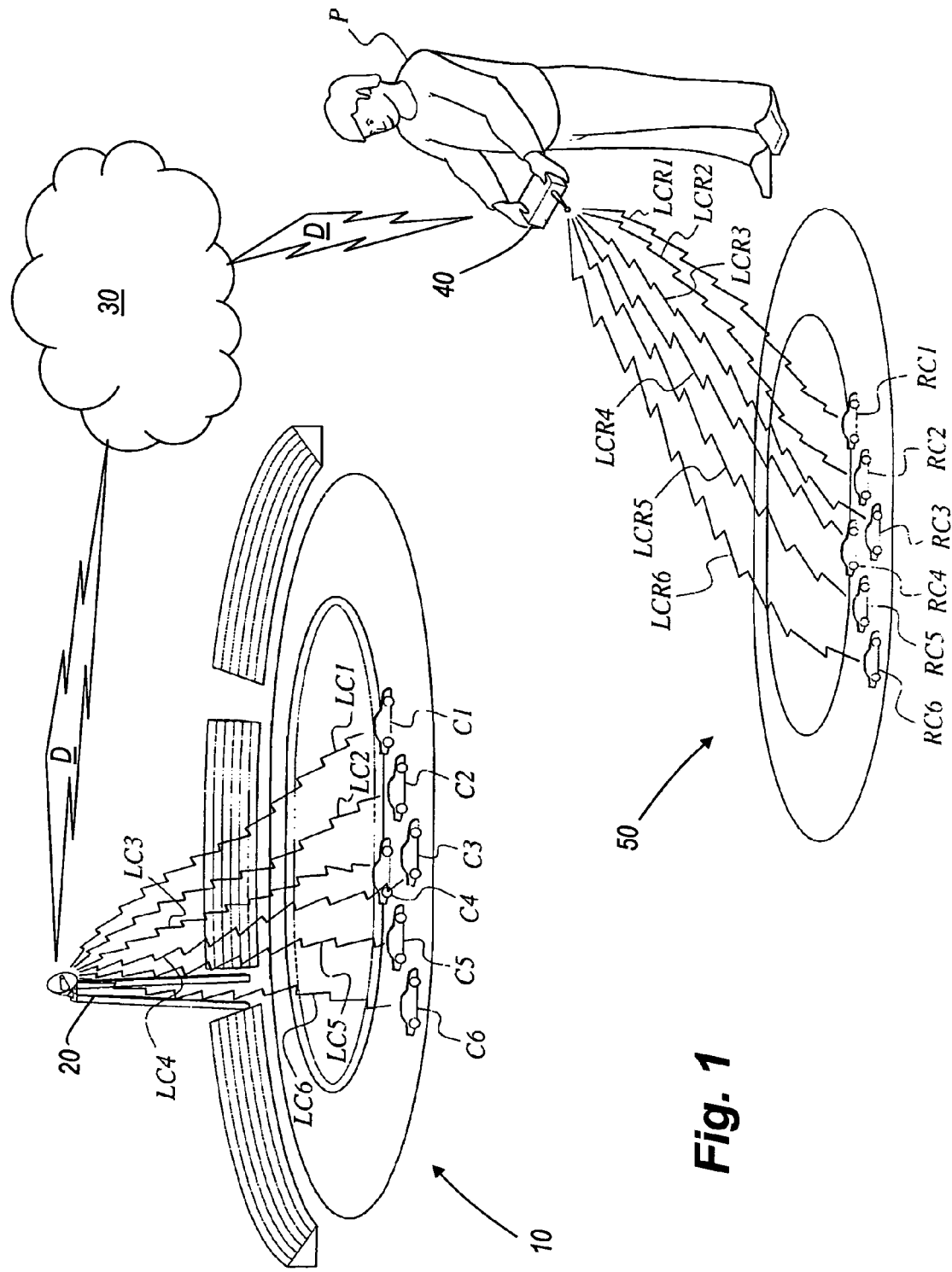
FIG. 1 is a pictorial diagram of a location data linked radio controlled system according to the present invention.

The present invention is external positioning data linked radio controlled system and method. The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

The system includes an infield RCV control device that accepts an external positioning signal and one or a plurality of RC vehicles (RCV) or toys. The infield RCV control device processes the external positioning information for both scaling and RC vehicle or toy compatibility. The infield RCV control device can be either hand held or mounted, with or without the need for human intervention. The RCV can be any off the shelf commercially available vehicle provided both the scale of the RCV as well as the controlling nature of the RCV is known.

The external data can be of any suitable form such as raw GPS data, PitMaster™ data available through online NASCAR™ pay services, or proprietary positioning data from a live or prerecorded event in which it is required to know the position of the participants of the event. Examples of such events where position data collection and transmission include, car races, horse race, boat races, airplane races, marathons, bike races, or any object capable of gathering and transmitting position data.

Using the example of an auto race emulation, each RCV unit is configured to move in a position, speed, and direction that corresponds to an associated remotely located full size race car. Movement of each RCV unit is effected by emulating each remotely located race car, as it drives around a race track, with each associated RCV unit via the infield RCV control device. Each RCV unit also includes a driving servomotor, a gear train, a steering control, RCV circuitry, and a battery. Propulsion of an RCV unit is affected by the driving servomotor interacting with the gear train, which interacts with the rear and/or front wheels of the RCV unit.

The infield RCV control device has a housing, and can include a power source, one or more controllers, an infield controller with infield software, memory with GPS software, a GPS transceiver coupled to a GPS antenna, an RF modem, a wireless transceiver coupled to a wireless antenna, and a communication bus communicatively interconnecting the components of the infield RCV control device. The infield RCV control device can also have an interface including buttons, keys, switches, ports, etc., to enable a user to input/output instructions, commands, settings, etc., as desired.

The infield software is configured to cause the received position, speed, and direction parameter data of actual race vehicles to associated controller cards contained within the infield RCV control device, to transfer converted position, speed, and direction parameter data of RCV units from the controller cards to the wireless transceiver, and to cause the wireless transceiver and the coupled antenna to transmit the converted radio control signals to cause the position, speed, and direction of the associated RCV unit to relatively replicate, mimic, or emulate the position, speed, and direction of the actual race vehicle in the actual race course. The infield software also contains an electronically stored map of the actual race course that is being traversed by the actual race cars in the remote location. This map provides an electronic boundary for the control signals that are transmitted to the RCV.

In essence, not only does the infield RCV control device constrain the RCV to emulate the relative position, speed and movement of the actual race car, but constrains the RCV to only move on a prescribed course as dictated by the infield's stored memory map of the actual race course itself.

Accordingly, it is a principal aspect of the invention to provide a motion emulation radio controlled system and method including at least one RCV unit and an infield RCV control device with appropriate software and hardware to affect the control of the RCV. The system is configured to cause the transfer of received position, speed, and direction parameter data of actual race vehicles to cause the position, speed, and direction of the associated RCV unit to relatively replicate the position, speed, and direction of the actual race vehicle in an actual race course.

Referring to the drawings, FIG. 1 shows an external positioning data linked radio controlled system for vehicle racing emulation according to the invention. During the actual racing event, race vehicles C1-C6 traverse around the remote race course 10. Positional information is obtained from remote vehicle data sensors on the vehicles C1-C6 and is then broadcast LC1-LC6 via an onboard remote vehicle wireless data transmitter to a remote data acquisition station 20. The positional data maybe in the form of GPS data for each vehicle or from embedded motion sensors within the vehicles C1-C6 or within the course 10 itself.

The vehicles' C1-C6 positional data D is assembled for each efficient data transmission and is relayed from the remote data acquisition station 20 via an appropriate transmission medium 30 such as the internet, microwave link, satellite, specially provided cable, Ethernet, etc., and is transmitted so that an infield RCV control device 40 receives this positional data D of the remote race vehicles. The user P can then interface with the infield RCV control device 40 to provide additional inputs and controls, as described herein. The infield RCV control device 40 then converts the inputs from both the positional data D and the user's locally input control signals to appropriately control RCVs RC1-RC6 that traverse a local track 50 that is a virtual, scaled, version of the actual race track 10. For real time events, the system exactly replicates the motion of race cars RC1-RC6 although on a scaled down version of the original race track 10.

Figure 2:
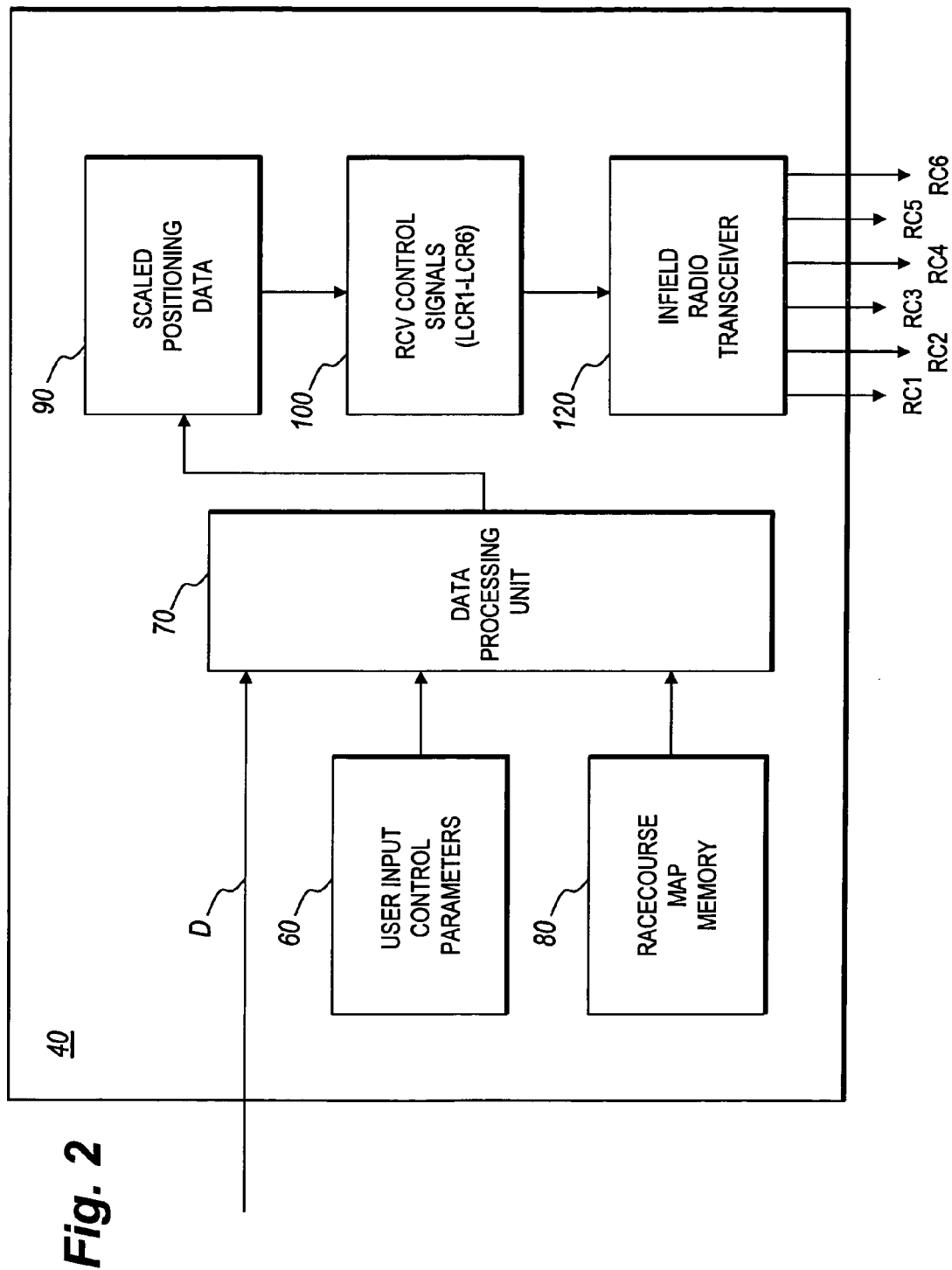
FIG. 2 is a block diagram of the infield unit data processing section according to the present invention.

The infield RCV control device 40 contains both hardware, software, and firmware in order to effect the proper conversion from the full sized event 10 down to the scaled version 50. FIG. 2 illustrates the components that make up the software of the infield RCV control device 40. The positional data D is fed into the infield RCV control device's data processing unit 70. Additionally, the user has the ability to input such control parameters 60 as, desired track scale factor, RCV scale factor, number of RCVs to use, assignment of particular RCVs for particular race cars RC1-RC6, etc. The desired track scale factor and/or RCV scale factor allows the data processing unit 70 to scale the overall event appropriately to fit the users desired virtual reality track.

For example, if we assume the RCV is a 1/100th scale model of an actual racing car, and the overall track is 2.5 miles in length then the data processing unit 70 will calculate the appropriate size required to faithfully reproduce a scaled version of the race, i.e., 0.025 miles in length or 132 feet in length. A circular track of this size would require the user's floor space to be 42 feet in diameter. The actual path that the RCVs would be restricted to is determined by and electronically reproduced map of the racecourse stored in a racecourse map memory 80. The data processing unit 70 then generates the appropriate scaled positioning data 90, which is incorporated into the appropriate RCV control signals 100 and transmitted via an infield radio transceiver 120 to the assigned RCVs, (RC1-RC6). The control signals LCR1-LCR6 can consist of motor speed control, potentiometer steering control, or any other required or optional RCV control signals that RCV enthusiast, manufacturers, and users of the art are familiar with for each RCV.

Figure 3:
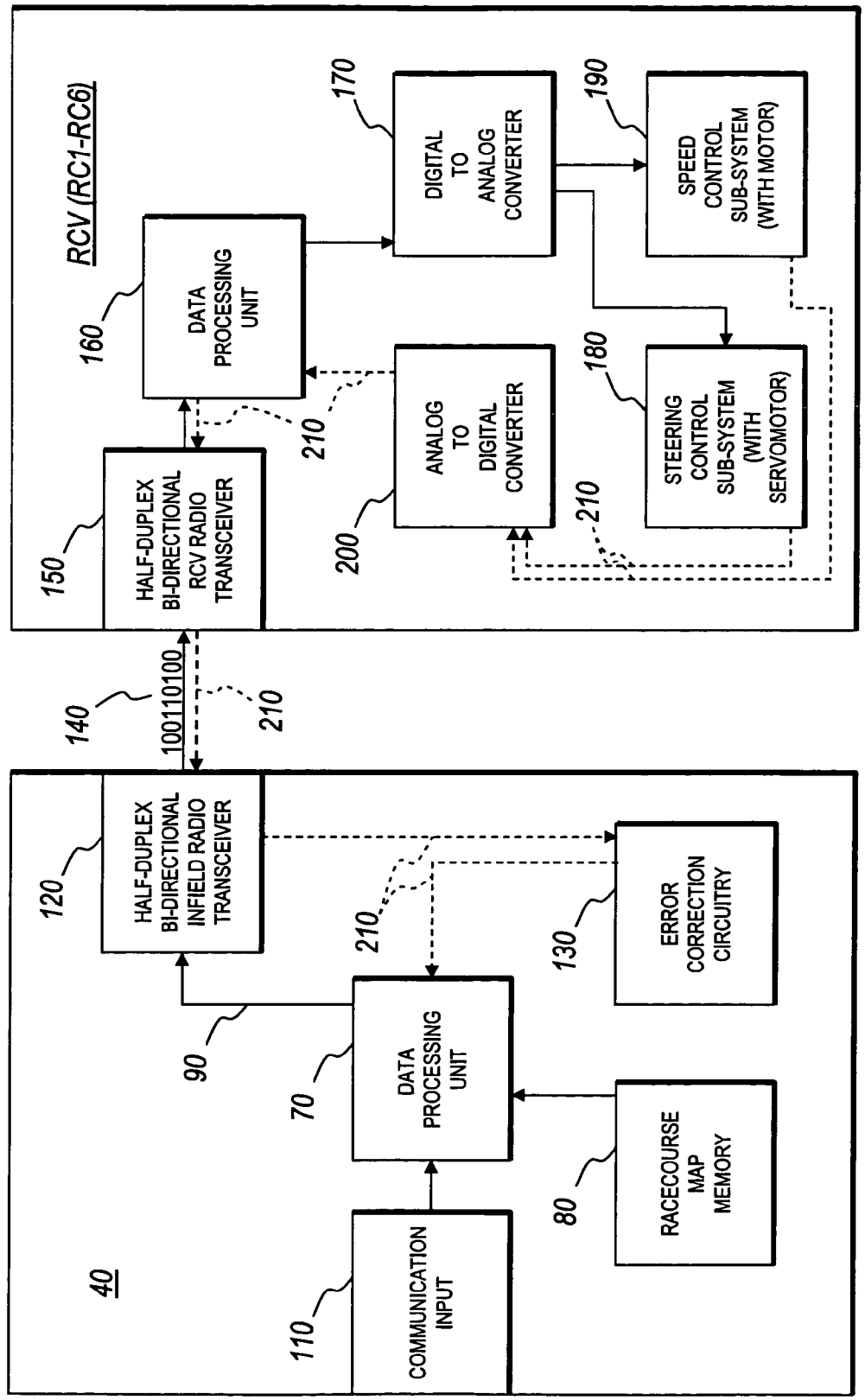
FIG. 3 is a block diagram of the infield unit data processing device and an associated RCV controller according to the present invention.

FIG. 3 illustrates the hardware components of the system. The infield RCV control device 40 accepts the positional data D via an appropriate means of connection to the transmission medium 30. The transmission medium 30 can be any one of a number of different configurations such as WAN, LAN, Internet, Satellite, DSL, PSTN, etc. The actual physical communication input connection 110 can be either a wired communication connection, e.g., Ethernet, RS232, USB, etc., or a wireless communication protocols such as 802.11, Bluetooth, wireless USB, IR, or any host of acceptable forms of wireless data communication.

The data processing unit 70 processes the received positional data D along with the electronically reproduced racecourse map in memory 80. The positional data D is modified and scaled with respect to the electronically reproduced map and is then appropriately packetized and sent 90 to the half-duplex bi-directional infield radio transceiver unit 120. The radio transceiver unit 120 is a generic term for wireless communications to the RCV and can consist of any of the wireless protocols familiar to those in the arts such as wireless USB, Bluetooth, IR, WiFi, Wireless modems, 802.11 a, b, g, etc., or even proprietary wireless protocols yet to be devised.

The way in which the infield RCV control device 40 communicates with the RCVs, RC1-RC6, is transparent to the invention as taught herein. The infield RCV control device 40 also contains an error correction circuitry 130 which can be as simple as simply reading the bi-directional data 140 received from the RCV and comparing it to the outgoing control data 90, or as complex as a Phase locked loop controller. The purpose of the error correction capability is to be able to read the actual positional and control signal as reported back from the RCVs, RC1-RC6, and adjust the new control signal accordingly, forming a bi-directional control feedback loop between the infield RCV control device 40 and each RCV which is continuously monitored and adjusted for optimum performance.

The RCV unit, e.g., RC1-RC6, also contains a complimentary half-duplex bi-directional RCV radio transceiver 150 and data processing unit 160 but performs the additional function of converting the received data 140 into voltage and current signals that control the various motors, servos, potentiometers and other control electronics that allow the RCV to move and steer. In order to accomplish this, a plurality of digital-to-analog converters 170 are used, as is familiar to those skilled in the art of RCV design.

These analog signals are then used, for example, to control speed control subsystems 190 having motors and steering control subsystems 180 having servomotors, etc. The individual analog control devices, i.e., the motors and servomotors, then have the capability of outputting to the data processing unit 160 via A-to-D conversion 200 of either the sensed voltage and/or current that is flowing through the devices as a measure of the control device's performance. This feedback data 210 is then sent back to the infield RCV control device 40 via the RCV-infield radio transceiver link (150, 120), and is fed to the error correction unit 130. The data processing unit 70 reads this information and adjusts the scaled and modified data output 90 accordingly.

The speed control subsystem includes a driving servomotor, a driving amplification circuit, a DC motor, and a potentiometer, and is configured to receive and operate in accordance with an input control signal, (i.e., LCR1-LCR6) transmitted within the received data 140. The input control signal (LCR1-LCR6) is a positive pulse control signal emitted from the infield RCV control device 40 and carries real-time position, speed, and direction information from the actual race vehicle (C1-C6) to which the RCV unit (RC1-RC6, respectively), is configured. The frequency range can be roughly 27 MHz or 40 MHz, depending on the country and the area. The driving amplification circuit can be configured in the form of an integrated chip.

The driving amplification circuit receives the positive pulse control signal transmitted from the infield RCV control device 40 and drives the DC motor to take a forward or backward rotation or to stop after a comparison operation. The motions of the servomotor include forward rotation, backward rotation, and stop. The servomotor rotates forward, rotates backward, and stops according to the position, speed, and direction information received from the data processing unit 160 via the D-to-A converter 170.

The steering control subsystem can includes a control servomotor and a steering hub adjacent and inboard of each front wheel of the RCV. Upper and lower pivotal steering shafts are connected to the hub extending coaxially upward and downwardly. The upper steering shaft is supportively engaged for rotation through an upper panel of the chassis. The lower steering shaft is supported for rotation within a lower panel of the chassis.

A steering pin connected to and upwardly extending from the hub is pivotally connected to a transverse steering linkage, which, in turn, is connected to an output of the steering servo. By this arrangement, the hub is controllably rotated about an upright steering axis of each front wheel to effect remote controlled steering of the RCV unit while underway.

The RCV control circuitry can be configured in the form of a control circuit board with a protective cover having a width just slightly smaller than that of the RCV unit itself, and be positioned along and attached to the upper margin of the chassis. The circuit board can include a small light emitting diode (LED) for indicating when the control circuit board has been actuated. Positioning of this control circuit board and cover can be within the enlarged passenger area of the RCV unit to provide clearance for the LED and also to provide a line of sight of the LED through a transparent or open windshield area of the RCV unit.

While the invention has been described with references to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

It is to be understood that the present invention is not limited to the embodiment(s) described above, but encompasses any and all embodiments within the scope of the following claims.

We claim:

1. An external positioning data linked radio controlled system for radio controlled vehicle (RCV) racing emulation, the system comprising:
   (a) an infield RCV control device for receiving externally generated positional data from remote race vehicles on a remote race course and locally input control signals from a user, the device having:
      (i) at least one input device for inputting the locally input control signals;
      (ii) at least one data processing unit connected to the input device;
      (iii) a memory connected to the data processing unit and having an electronically reproduced racecourse map of the remote racecourse stored thereon for computing an electronic boundary for RCV devices;
      (iv) an error correction circuit connected to the data processing unit for generating error correction signals; and
      (v) means for transmitting wireless local control RCV signals containing RCV position, speed and direction data based on processing the externally generated positional data, the locally input control signals, and error correction signals; and
      (vi) means for receiving the externally generated positional data; and;
   (b) at least one RCV responsive to the wireless local control RCV signals containing position, speed and direction data transmitted by said infield RCV control device, the RCV having:
      (i) means for receiving the wireless local control RCV signals containing position, speed and direction data transmitted by said infield RCV control device
      (ii) RCV control circuitry for controlling movement of the RCV in response to the received wireless local control RCV signals;
      (iii) a steering control sub-system connected to the RCV control circuitry;
      (iv) a motor control sub-system connected to the RCV control circuitry;
      (v) an independent power source connected to the RCV control circuitry.

2. The radio controlled system of claim 1, wherein said locally input control signals contain data selected from the group consisting of:
   a track scale factor;
   a RCV scale factor;
   the number of RCVs in use; and,
   assignment information linking particular local RCVs to respond to positional data from particular vehicles of said remote race vehicles.

3. The radio controlled system of claim 1, wherein said error correction circuitry is selected from the group consisting of:

means for comparing onboard RCV directional data to said transmitted wireless local control RCV signals; and,
a phased lock loop controller.

4. The radio controlled system of claim 1, wherein said RCV control circuitry includes:
an RCV data processing unit connected to said receiving means;
at least one digital-to-analog converter connected to the RCV data processing unit; and
at least one A-to-D converter connected to the RCV data processing unit.

5. The radio controlled system of claim 4, wherein said radio transceiver comprises a half-duplex bi-directional radio transceiver.

6. The radio controlled system of claim 1, wherein said steering control sub-system further includes:
a servomotor connected to the RCV control circuitry;
a steering hub connected to the servomotor;
upper and lower steering shafts connected to the steering hub; and
a steering pin connected to the steering shafts.

7. The radio controlled system of claim 1, wherein said motor control sub-system further includes:
a driving amplification circuit connected to the RCV control circuitry;
a motor connected to the driving amplification circuit;
a potentiometer connected to the driving amplification circuit; and
a gear train connected to the motor.

8. The radio controlled system of claim 1, wherein said infield RCV controller device further comprises at least one controller card for receiving position, speed and direction data for a specific RCV for transmission by the transmitting means to said specific RCV.

9. The radio controlled system of claim 1, wherein said steering control and motor control sub-systems have means for generating feedback signals, said error correction signals being responsive to the feedback signals received from said steering control and motor control sub-systems on said at least one RCV.

10. The radio controlled system of claim 9, wherein said at least one RCV further comprises:
at least one digital-to-analog converter for converting the wireless local control RCV signals into analog input signals to control said motor control sub-system; and
at least one analog-to-digital converter for converting voltage or current output levels of said motor control sub-system into the feedback signals.

11. A method of controlling a radio controlled vehicle (RCV) racing emulation by an external positioning data linked radio controlled system, comprising the steps of:
a remote data station having a processor and memory for:
generating positional data from a plurality of remote vehicles;
transmitting said positional data of said plurality of remote vehicles for reception at an infield RCV control device;
the infield RCV control device having a processor and memory for:
receiving user input at said infield RCV control device;
processing said transmitted positional data, said received user input, and an electronically reproduced racecourse map stored in memory to generate scaled positioning data;
transmitting said scaled positioning data from a wireless transmission device on said infield RCV control device to be received by at least one RCV;
the at least one RCV having a processor and memory for:
processing said scaled positioning data at said at least one RCV; and
controlling a motor on said at least one RCV as a result of said step of processing.

12. The method of controlling a radio controlled vehicle (RCV) racing emulation of claim 11, wherein said step of generating positional data from said plurality of remote vehicles further includes the steps of:
generating positional data on each of said plurality of remote vehicles;
transmitting said generated positional data of each of said plurality of remote vehicles to a remote location data acquisition device; and
assembling said transmitted positional data of each of said plurality of remote vehicles for transmission to an infield RCV control device.

13. The method of controlling a radio controlled vehicle (RCV) racing emulation of claim 11, wherein said user input further contains data selected from the group consisting of:
a track scale factor;
a RCV scale factor;
the number of RCVs in use; and,
assignment information linking particular local RCVs to respond to said positional data from a particular one of said plurality of remote race vehicles.

14. The method of controlling a radio controlled vehicle (RCV) racing emulation of claim 11, wherein said step of transmitting said positional data of said plurality of remote vehicles to an infield RCV control device further includes a transmitting connection selected from the group consisting of:
a wired transmission connection; and
a wireless transmission connection.

15. The method of controlling a radio controlled vehicle (RCV) racing emulation of claim 11, wherein said step of controlling said motor on said RCV comprises controlling location, speed and direction of said RCV.

16. The method of controlling a radio controlled vehicle (RCV) racing emulation of claim 11, further including the step of generating an error correction signal from said motor of said RCV for transmission to an error correction circuit in said infield RCV control device.

17. The method of controlling a radio controlled vehicle (RCV) racing emulation of claim 16, further comprising transmitting said error correction signal from a bi-directional transceiver of said RCV to a bi-directional transceiver of said infield RCV control device.

18. The method of controlling a radio controlled vehicle (RCV) racing emulation of claim 17, wherein said step of generating said error correction signal further comprises receiving at an analog-to-digital signal converter one of voltage or current feedback signals from said motor.

* * * * *